(12) United States Patent
Megeid (10) Patent No.: US 7,978,959 B2
(45) Date of Patent: Jul. 12, 2011

(54) MEMORY ADDRESSING METHOD SUITABLE FOR SYSTEMS HAVING A VARIABLE SPEED DATA REPRODUCTION CAPABILITY

(75) Inventor: Magdy Megeid, Zurich (CH)

(73) Assignee: Thomsong Licensing, Boulogne Billancourt (FR)

( * ) Notice: Subject to any disclaimer, the term of this patent is extended or adjusted under 35 U.S.C. 154(b) by 1975 days.

(21) Appl. No.: 10/343,600

(22) PCT Filed: Jun. 29, 2001

(86) PCT No.: PCT/IB01/01159
§ 371 (c)(1),
(2), (4) Date: Feb. 3, 2003

(87) PCT Pub. No.: WO02/13196
PCT Pub. Date: Feb. 14, 2002

(65) Prior Publication Data
US 2004/0062524 A1    Apr. 1, 2004

Related U.S. Application Data

(60) Provisional application No. 60/224,260, filed on Aug. 10, 2000.

(51) Int. Cl.
*H04N 5/92* (2006.01)
(52) U.S. Cl. .......................... 386/327; 386/343; 386/353
(58) Field of Classification Search .................... 386/68, 386/81, 327, 343, 353
See application file for complete search history.

(56) References Cited

U.S. PATENT DOCUMENTS 5,440,718 A    8/1995    Kumagai et al. .............. 395/481
(Continued)

FOREIGN PATENT DOCUMENTS

JP    8/211894    8/1996
(Continued)

OTHER PUBLICATIONS

Database WPI, Section PQ, week 199844, Derwent Publications Ltd, XP002188326 and JP Patent 10/222806.
(Continued)

*Primary Examiner* — Thai Tran
*Assistant Examiner* — Girumsew Wendmagegn
(74) *Attorney, Agent, or Firm* — Robert D. Shedd; Joseph J. Opalach; Reitseng Lin (57) ABSTRACT

A memory addressing method is suitable for systems performing data compression and/or expansion such as audio and/or video systems having a variable speed data reproduction capability. According to an exemplary embodiment, a method for processing a signal such as an audio or video signal in a signal reproduction device begins by receiving the signal. The received signal is processed in dependence upon a mode of operation of the signal reproduction device representing a speed at which the received signal is to be reproduced by the signal reproduction device. The received signal is speed converted and then stored in a memory of the signal reproduction device when the signal reproduction device is in a first mode of operation. The received signal is stored in the memory of the signal reproduction device without being speed converted when the signal reproduction device is in a second mode of operation. According to an embodiment, the first mode of operation represents that the received signal will be reproduced by the signal reproduction device at a speed greater than an input speed corresponding to the received signal. The second mode of operation represents that the received signal will be reproduced by the signal reproduction device at a speed less than or equal to an input speed corresponding to the received signal.

22 Claims, 3 Drawing Sheets

U.S. PATENT DOCUMENTS

| | | | |
|---|---|---|---|
| 5,457,667 A | 10/1995 | Kojima et al. | 369/32 |
| 5,761,275 A | 6/1998 | Irie | 379/88 |
| 5,809,454 A | 9/1998 | Okada et al. | 704/214 |
| 5,887,110 A * | 3/1999 | Sakamoto et al. | 386/68 |
| 5,982,431 A * | 11/1999 | Chung | 375/240.01 |
| 6,434,321 B1 * | 8/2002 | Eshima | 386/75 |
| 6,665,751 B1 * | 12/2003 | Chen et al. | 710/52 |

FOREIGN PATENT DOCUMENTS

| | | |
|---|---|---|
| JP | 10/027000 | 1/1998 |
| JP | 10/222806 | 8/1998 |

OTHER PUBLICATIONS

Patent Abstracts of Japan, vol. 1996, No. 12, Dec. 26, 1996 and JP Patent 8/211894.

Patent Abstracts of Japan, vol. 1998, No. 5, Apr. 30, 1998 and JP Patent 10/027000.

Nejime Yoshito et al "A Portable Digital Speech-Rate Converter for Hearing Impairment", IEEE Transactions on Rehabilitation Engineering, IEEE Inc. New York US, vol. 4, No. 2, Jun. 1, 1996, pp. 73-83.

* cited by examiner

MEMORY ADDRESSING METHOD SUITABLE FOR SYSTEMS HAVING A VARIABLE SPEED DATA REPRODUCTION CAPABILITY

This application claims the benefit under 35 U.S.C. §365 of International Application PCT/IB01/01159, filed Jun. 29, 2001, which was published in accordance with PCT Article 21(2) on Feb. 14, 2002 in English; and which claims benefit of U.S. Provisional Application Ser. No. 60/224,260 filed Aug. 10, 2000.

BACKGROUND

1. Field of the Invention

The present invention generally relates to data compression and/or expansion, and more particularly, to a memory addressing method suitable for systems performing data compression and/or expansion such as audio and/or video systems having a variable speed data reproduction capability.

2. Background Information

At present, many commercially-available electrical devices such as consumer electronics products do not provide variable speed data reproduction capabilities. However, it is anticipated in the future that such capabilities may become more commonplace in these devices. A variable speed data reproduction capability can provide users with the ability to control the speed at which data such as audio and/or video data is reproduced. That is, a user may provide inputs to increase or decrease the speed at which a video and/or audio segment is played back. For example, a user may manipulate buttons or make menu selections regarding the speed at which reproduction will take place.

In devices providing such a variable speed data reproduction capability, signal compression or expansion may be used to increase or decrease the rate of speed at which data is reproduced. These devices also require memory devices such as dynamic random access memory (DRAM) for the storage of data. The cost of devices having a variable speed data reproduction capability depends among other things on the size of the memory used. Therefore, in order to minimize the cost of these devices, it is incumbent to keep memory requirements for these devices as low as possible. The present invention addresses this and other problems.

SUMMARY

In accordance with an aspect of the invention, a system for processing a signal, comprises means for receiving the signal and means for processing the received signal in dependence upon a mode of operation of the system representing a speed at which said received signal is to be reproduced by the system, wherein the received signal is speed converted and then stored in memory means of the system when said system is in a first mode of operation, and wherein said received signal is stored in said memory means of said system without being speed converted when said system is in a second mode of operation.

In accordance with another aspect of the invention, a method for processing a signal in a signal reproduction device comprises steps of receiving the signal and processing the received signal in dependence upon a mode of operation of the signal reproduction device representing a speed at which the received signal is to be reproduced by the signal reproduction device, wherein the received signal is speed converted and then stored in a memory of the signal reproduction device when the signal reproduction device is in a first mode of operation, and wherein the received signal is stored in the memory of the signal reproduction device without being speed converted when the signal reproduction device is in a second mode of operation.

The exemplifications set out herein illustrate preferred embodiments of the invention, and such exemplifications are not to be construed as limiting the scope of the invention in any manner.

DESCRIPTION OF THE PREFERRED EMBODIMENTS

This application discloses a memory addressing system and method which are suitable for systems performing data compression and/or expansion such as audio and/or video systems having a variable speed data reproduction capability. According to an exemplary embodiment, a method for processing a signal such as an audio or video signal in a signal reproduction device begins by receiving the signal. The received signal is processed in dependence upon a mode of operation of the signal reproduction device representing a speed at which the received signal is to be reproduced by the signal reproduction device. The received signal is speed converted and then stored in a memory of the signal reproduction device when the signal reproduction device is in a first mode of operation. The received signal is stored in the memory of the signal reproduction device without being speed converted when the signal reproduction device is in a second mode of operation.

According to an embodiment, the first mode of operation represents that the received signal will be reproduced by the signal reproduction device at a speed greater than an input speed corresponding to the received signal. The second mode of operation represents that the received signal will be reproduced by the signal reproduction device at a speed less than or equal to an input speed corresponding to the received signal.

Figure 1:
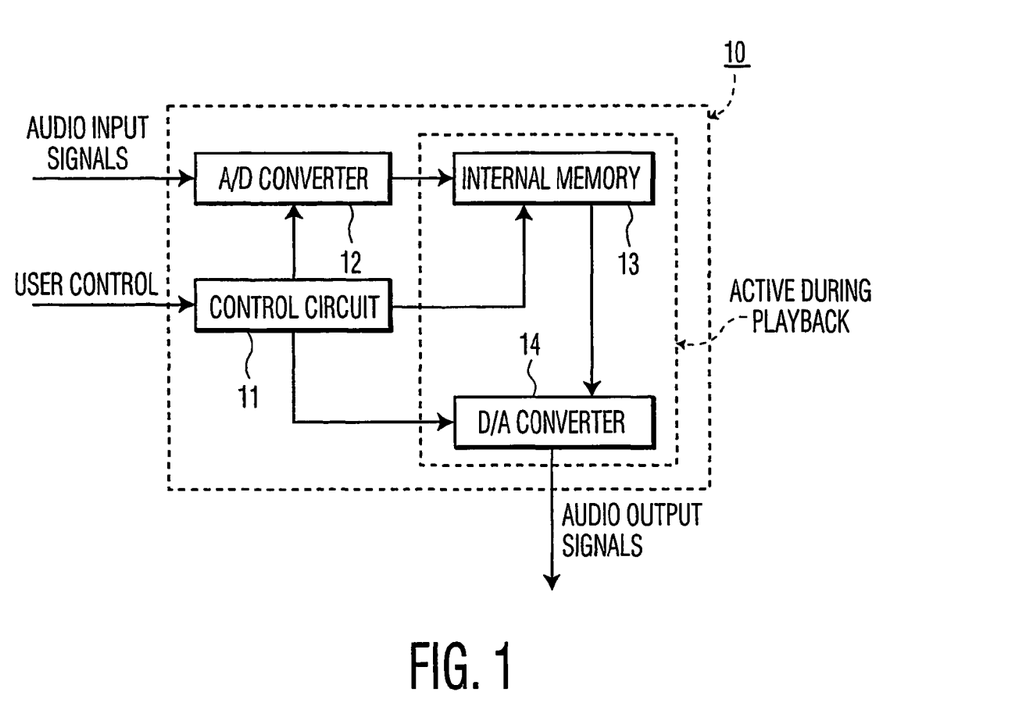
FIG. 1 is a schematic diagram of an exemplary audio device.

Referring now to the drawings, and more particularly to FIG. 1, a schematic diagram of an exemplary audio device is shown. In particular, FIG. 1 illustrates a relevant portion of an audio device 10 such as a digital telephone answering device or other similar device. In FIG. 1, a control circuit 11 controls the operation of the audio device 10 at least in part based on user control inputs. An analog-to-digital (A/D) converter 12 receives audio input signals in analog format and converts the received audio input signals to a digital format under the control of the control circuit 11. An internal memory 13 stores digital audio signals received from the analog-to-digital (A/D) converter 12 under the control of the control circuit 11. A digital-to-analog (D/A) converter 14 receives digital audio signals from the internal memory 13, converts the received digital audio signals to an analog format and provides audio output signals in an analog format under the control of the control circuit 11. AS indicated in FIG. 1, when the audio device 10 is in a playback mode, the internal memory 13 and the digital-to-analog (D/A) converter 14 are active in that the internal memory 13 transfers digital audio signals to the digital-to-analog (D/A) converter 14 for conversion and output. The audio device 10 of FIG. 1 provides audio output signals at a constant speed equal to an original input speed, and does not provide an audio speed conversion capability.

Figure 2:
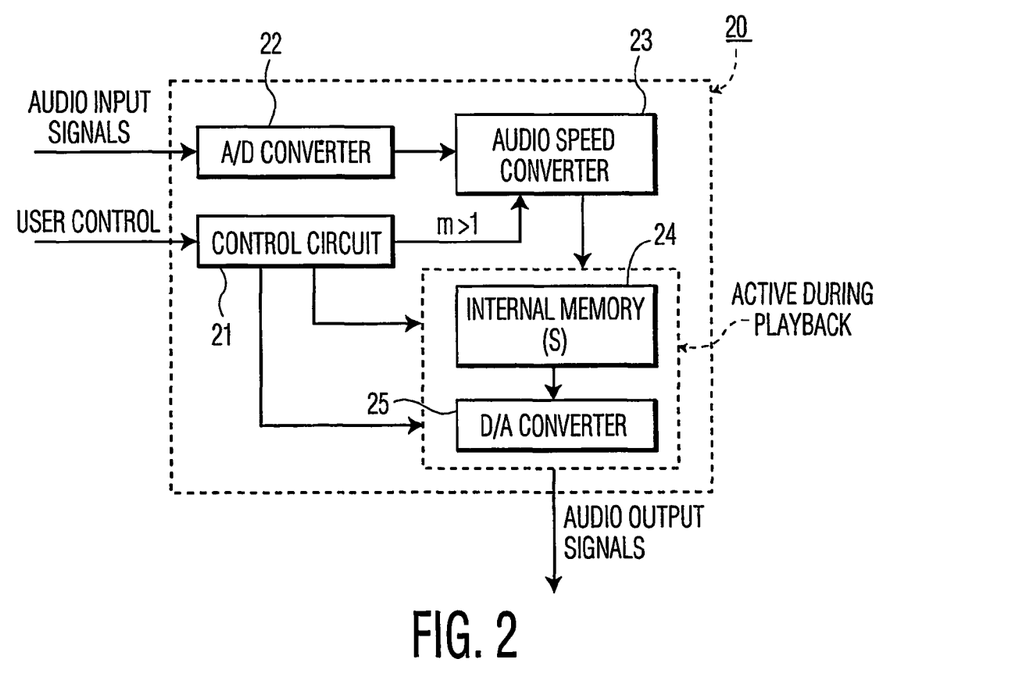
FIG. 2 is a schematic diagram of another exemplary audio device.

Referring to FIG. 2, a schematic diagram of another exemplary audio device is shown. In particular, FIG. 2 Illustrates a relevant portion of an audio device 20, such as a digital telephone answering device or other similar device, which provides an audio speed conversion capability. In FIG. 2, a control circuit 21 controls the operation of the audio device 20 at least in part based on user control inputs. An analog-to-digital (A/D) converter 22 receives audio input signals in analog format and converts the received audio input signals to a digital format under the control of the control circuit 21. An audio speed converter 23 receives digital audio signals from the analog-to-digital (A/D) converter 22 and performs an audio speed conversion process under the control of the control circuit 21. In particular, the control circuit 21 provides a control signal to the audio speed converter 23 indicating a speed rate (m) for the speed conversion process. The speed rate (m) may be designated by a user control input. An internal memory 24 having a storage capacity (S) stores digital audio signals received from the audio speed converter 23 under the control of the control circuit 21. A digital-to-analog (D/A) converter 25 receives digital audio signals from the internal memory 24, converts the received digital audio signals to an analog format and provides audio output signals under the control of the control circuit 21. AS indicated in FIG. 2, when the audio device 20 is in a playback (i.e., reproduction) mode, the internal memory 24 and the digital-to-analog (D/A) converter 25 are active in that the internal memory 24 transfers digital audio signals to the digital-to-analog (D/A) converter 25 for conversion and output.

AS previously indicated, the audio device 20 of FIG. 2 provides an audio speed conversion capability in dependence upon the speed rate (m) which may be designated by a user control input. For purposes of example and explanation, assume in FIG. 2 that m=3/2 which means that the speed of the audio output signals is one and a half times faster than the speed of the audio input signals. In this case, the digital audio signals output by the analog-to-digital (A/D) converter 22 are compressed by the audio speed converter 23 such that the amount of digital data present after the compression is only two-thirds the amount of digital data prior to the compression. That is, the fractional amount of data present after the compression as compared to the amount of data prior to the compression is inversely proportional to the speed rate (m). The compressed data output from the audio speed converter 23 is stored in the internal memory 24. When the speed rate is such that m>1, it is advantageous to compress the audio data prior to storing it due to the data reduction achieved from the compression. This results in preserving memory capacity. In particular, when m=3/2 in FIG. 2, the internal memory 24 appears to be one and a half times larger than its original size (S) due to the compression. At playback, the previously compressed data is read out of the internal memory 24 and converted to analog format by the digital-to-analog (D/A) converter 25.

For purposes of further example and explanation, now assume in FIG. 2 that m=1/2 which means that the speed of the audio output signals is only one half the speed of the audio input signals. In this case, the digital audio signals output by the analog-to-digital WD) converter 22 are expanded by the audio speed converter 23 such that the amount of digital data present after the expansion is twice the amount of digital data prior to the expansion. The expanded data output from the audio speed converter 23 is stored in the internal memory 24. In FIG. 2, storing the expanded data in the internal memory 24 is undesirable due to the excess use of memory capacity. In particular, when m=1/2 in FIG. 2, the internal memory 24 appears to be only one half its original size (S) due to the fact that expanded data is being stored. Accordingly, the exemplary audio device 20 of FIG. 2 is best suited for audio playback speeds where m>1.

Figure 3:
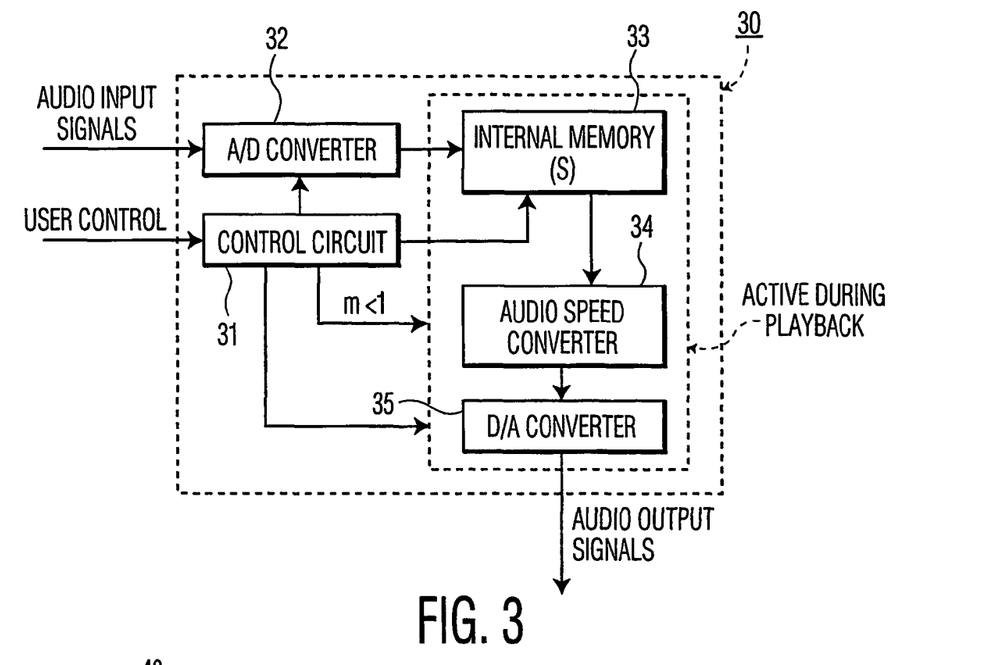
FIG. 3 is a schematic diagram of still another exemplary audio device.

Referring to FIG. 3, a schematic diagram of still another exemplary audio device is shown. In particular, FIG. 3 illustrates a relevant portion of another audio device 30, such as a digital telephone answering device or other similar device, which provides an audio speed conversion capability. In FIG. 3, a control circuit 31 controls the operation of the audio device 30 at least in part based on user control inputs. An analog to-digital (A/D) converter 32 receives audio input signals in analog format and converts the received audio input signals to a digital format under the control of the control circuit 31. An internal memory 33 having a storage capacity (S) stores digital audio signals received from the analog-to-digital (A/D) converter 32 under the control of the control circuit 31. An audio speed converter 34 receives digital audio signals from the internal memory 33 and performs an audio speed conversion process under the control of the control circuit 31. In particular, the control circuit 31 provides a control signal to the audio speed converter 34 indicating a speed rate (m) for the speed conversion process. The speed rate (m) may be designated by a user control input. A digital-to-analog (D/A) converter 35 receives digital audio signals from the audio speed converter 34, converts the received digital audio signals to an analog format and provides audio output signals under the control of the control circuit 31. AS indicated in FIG. 3, when the audio device 30 is in a playback (i.e., reproduction) mode, the internal memory 33, the audio speed converter 34 and the digital-to-analog (D/A) converter 35 are active. In particular, during playback the internal memory 33 transfers digital audio signals to the audio speed converter 34 for speed conversion in accordance with the speed rate (m). The audio speed converter 34 then provides digital audio signals to the digital-to-analog (D/A) converter 35 for conversion and output as analog audio output signals.

AS previously indicated, the audio device 30 of FIG. 3 provides an audio speed conversion capability in dependence upon the speed rate (m) which may be designated by a user control input. For purposes of example and explanation, assume in FIG. 3 that m=3/2 which means that the speed of the audio output signals is one and a half times faster than the speed of the audio input signals. In this case, the digital audio signals output by the analog-to-digital (A/D) converter 32 are stored without compression in the internal memory 33. At playback, the uncompressed digital audio signals are read out of the internal memory 33 and input to the audio speed converter 34. The audio speed converter 34 compresses the input digital signals such that the amount of digital data present after the compression is only two-thirds the amount of digital data prior to the compression. That is, the fractional amount of data present after the compression as compared to the amount of data prior to the compression is inversely proportional to the speed rate (m). The compressed data output from the audio speed converter 34 is then provided to the digital-to-analog (D/A) converter 35 for conversion and output as analog audio output signals. When the speed rate is such that m>1, it is undesirable to store uncompressed data in the internal memory 33 since this results in storing some unnecessary data which will later be deleted by the audio speed converter 34. In particular, when m=3/2 in FIG. 3, the internal memory 33 appears to be only two-thirds its original size (S).

For purposes of further example and explanation, now assume in FIG. 3 that m=1/2 which means that the speed of the audio output signals is only one half the speed of the audio input signals. In this case, the digital audio signals output by the analog-to-digital (A/D) converter 32 are stored in the internal memory 33 without expansion. At playback, the unexpanded digital audio signals are read from the internal memory 33 and provided to the audio speed converter 34 for expansion. In particular, the audio speed converter 34 expands the digital audio signals such that the amount of digital data present after the expansion is twice the amount of digital data prior to the expansion. In FIG. 3, storing the unexpanded data in the internal memory 33 is advantageous. In particular, when m=1/2 in FIG. 3, the internal memory 33 appears to be twice its original size (S). Accordingly, the exemplary audio device 30 of FIG. 3 is best suited for audio playback speeds where m<1.

From the foregoing description of FIGS. 2 and 3, it should be clear that memory location plays an important role in systems having variable speed capability where data compression and expansion are performed. In particular, for situations where m>1, the data should be compressed prior to storage. Conversely, for situations where m<1, the data should be stored prior to expansion. This results in an advantageous use of memory resources.

Figure 4:
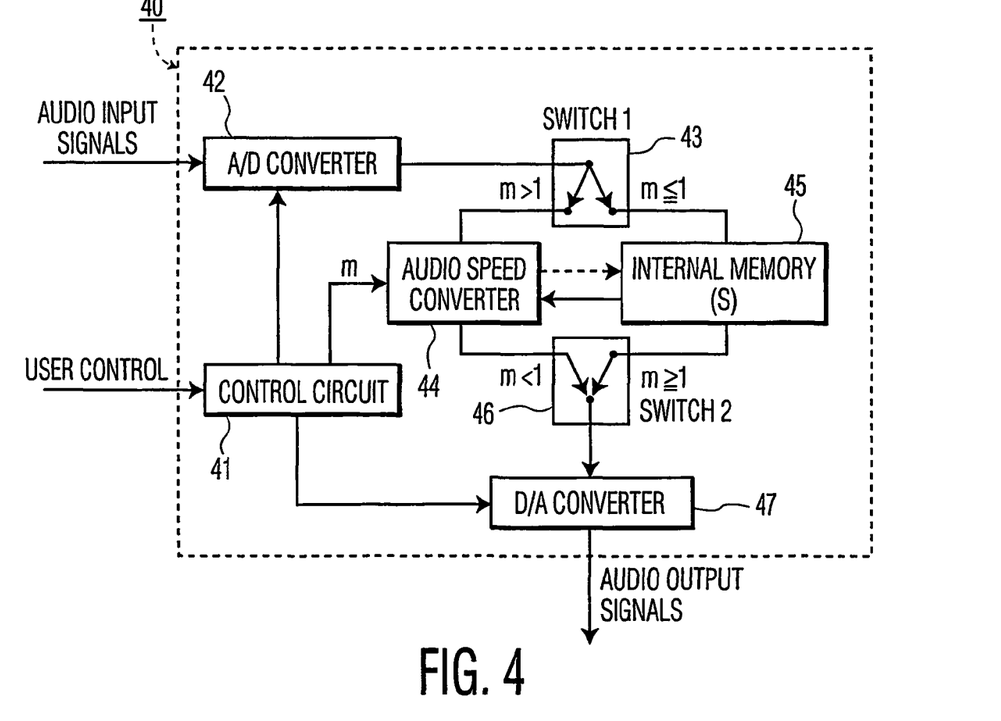
FIG. 4 is a schematic diagram of an audio device constructed according to principles of the present invention.

Referring now to FIG. 4, a schematic diagram of an audio device constructed according to principles of the present invention is shown. In particular, FIG. 4 illustrates a relevant portion of an audio device 40, such as a digital telephone answering device or other similar device, which provides an audio speed conversion capability. In FIG. 4, a control circuit 41 controls the operation of the audio device 40 at least in part based on user control inputs. An analog-to-digital (A/D) converter 42 receives audio input signals in analog format and converts the received audio input signals to a digital format under the control of the control circuit 41. A first digital switch 43 (i.e., switch1) receives digital audio signals from the analog-to-digital (A/D) converter 42 and provides a signal pathway for the received digital audio signals in dependence upon a speed rate (m), which may be designated by a user control input. In FIG. 4, the first digital switch 43 provides a first signal pathway for the received digital audio signals when m>1, and provides a second signal pathway for the received digital audio signals when m≦1. The position of the first digital switch 43 is controlled by the control circuit 41.

In situations where m>1, the control circuit 41 causes the first digital switch 43 to establish the first signal pathway. In this case, an audio speed converter 44 receives the digital audio signals from the analog-to-digital (A/D) converter 42 via the first digital switch 43. Alternatively, in situations where m≦1, the control circuit 41 causes the first digital switch 43 to establish the second signal pathway. In this case, an internal memory 45 having a storage capacity (S) receives the digital audio signals from the analog-to-digital (AND) converter 42 via the first digital switch 43. A second digital switch 46 (i.e., switch2) receives outputs from the audio speed converter 44 or the internal memory 45 under the control of the control circuit 41. In particular, the second digital switch 46 operates in dependence upon the speed rate (m). A digital-to-analog (D/A) converter 47 receives digital audio signals from the audio speed converter 44 or the internal memory 45 via the second digital switch 46, converts the received digital audio signals to an analog format and provides analog audio output signals under the control of the control circuit 41.

In situations where m>1, the control circuit 41 causes the second digital switch 46 to connect the output of the internal memory 45 to the input of the digital-to-analog (D/A) converter 47. Alternatively, in situations where m<1, the control circuit 41 causes the second digital switch 46 to connect the output of the audio speed converter 44 to the input of the digital-to-analog (D/A) converter 47. In situations where m=1 (i.e., normal operation), the control circuit 41 causes the second digital switch 46 to connect the output of the internal memory 45 to the input of the digital-to-analog (D/A) converter 47, thereby bypassing the audio speed converter 44.

For purposes of example and explanation, assume in FIG. 4 that m=2 which means that the speed of the audio output signals is twice as fast as the speed of the audio input signals. In this case, the digital audio signals output by the analog-to-digital (A/D) converter 42 are input to the audio speed converter 44 via the first digital switch 43. The audio speed converter 44 compresses the input digital audio signals in accordance with the speed rate (m), and transfers compressed digital audio signals to the internal memory 45 for storage. At playback, the compressed digital audio signals are read out of the internal memory 45 and transferred to the digital-to-analog (D/A) converter 47 via the second digital switch 46 under the control of the control circuit 41. The digital-to-analog (D/A) converter 47 converts the compressed digital audio signals to analog format and provides analog audio output signals under the control of the control circuit 41. In FIG. 4, the dashed lines in the first and second digital switches 43 and 46 and the dashed line between the audio speed converter 44 and the internal memory 45 represent a portion of the signal path utilized when m=2.

For purposes of further example and explanation, now assume in FIG. 4 that m=1/2 which means that the speed of the audio output signals is only one half the speed of the audio input signals. In this case, the digital audio signals output by the analog-to-digital (A/D) converter 42 are input to the internal memory 45 for storage via the first digital switch 43. At playback, the stored digital audio signals are read out of the internal memory 45 and transferred to the audio speed converter 44 for expansion in accordance with the speed rate (m). The expanded digital audio signals are output from the audio speed converter 44 and transferred to the digital-to-analog (D/A) converter 47 via the second digital switch 46 under the control of the control circuit 41. The digital-to-analog (D/A) converter 47 converts the expanded digital audio signals to analog format and provides analog audio output signals under the control of the control circuit 41. In FIG. 4, the solid lines in the first and second digital switches 43 and 46 and the solid line between the audio speed converter 44 and the internal memory 45 represent a portion of the signal path utilized when m=1/2.

Figure 5:
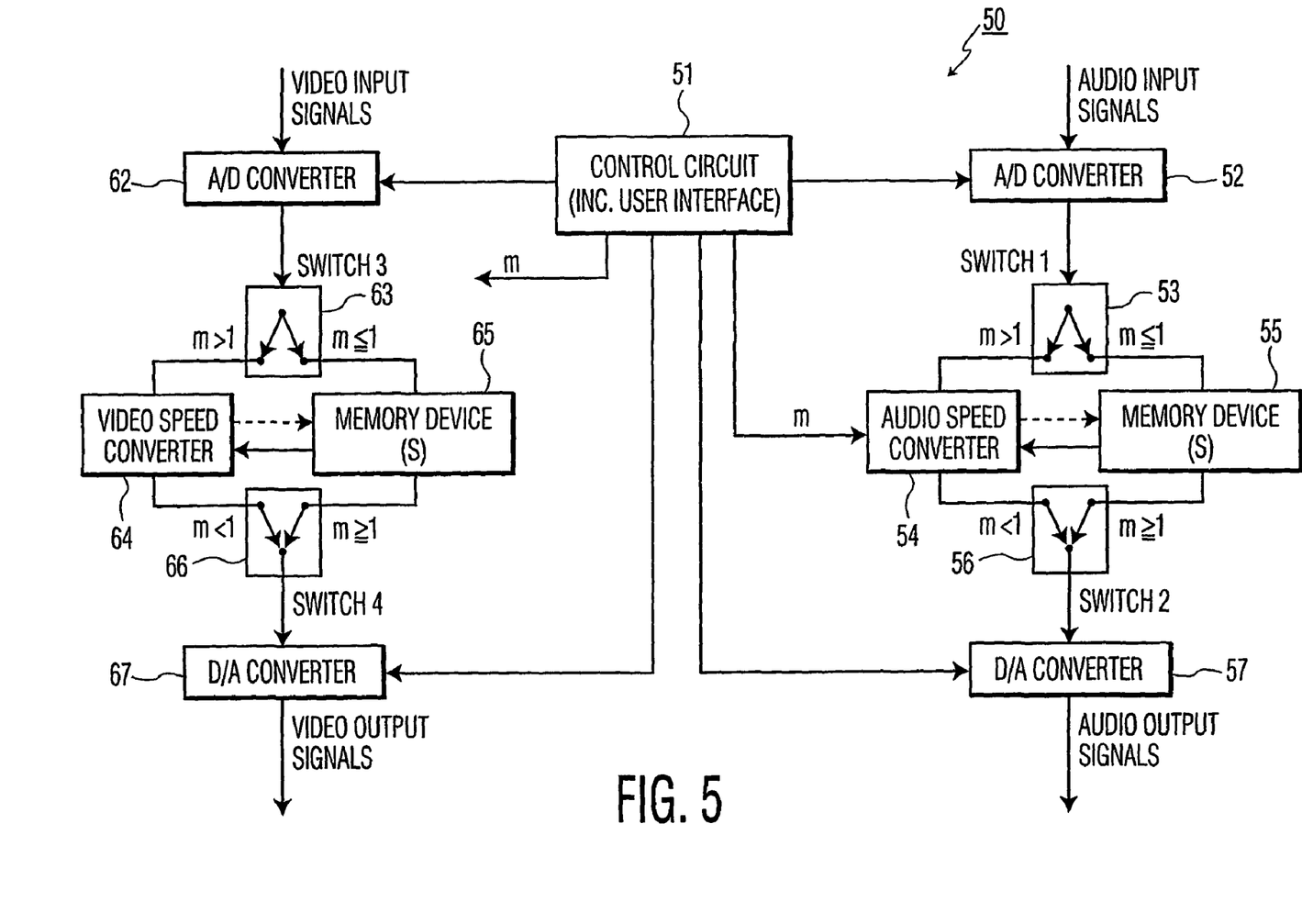
FIG. 5 is a schematic diagram of an audio/video device constructed according to principles of the present invention.

Referring now to FIG. 5, a schematic diagram of an audio/video device constructed according to principles of the present invention is shown. In particular, FIG. 5 illustrates a relevant portion of an audio/video device 50, such as a digital video answering device, video tape recorder (VTR) or other similar device, which provides an audio and/or video speed conversion capability. The audio/video device 50 of FIG. 5 expands the memory addressing technique described in FIG. 4 to include video signals. In FIG. 5, a control circuit 51 including a user interface enables a user to designate a desired speed rate (m) for playback Of audio and/or video signals. AS shown in FIG. 5, one side of the audio/video device 50 processes audio signals, while the other side processes video signals. Regarding the audio aspect of the device 50, an analog-to-digital (A/D) converter 52 receives audio input signals in analog format and converts the received audio input signals to a digital format under the control of the control circuit 51. A first digital switch 53 (i.e., switch1) receives digital audio signals from the analog-to-digital (A/D) converter 52 and provides a signal pathway for the received digital audio signals in dependence upon a speed rate (m), which may be designated by a user through the user interface 51. In FIG. 5, the first digital switch 53 provides a first signal pathway for the received digital audio signals when m>1, and provides a second signal pathway for the received digital audio signals when m≦1. The position of the first digital switch 53 is controlled by the control circuit 51.

In situations where m>1, the control circuit 51 causes the first digital switch 53 to establish the first signal pathway. In this case, an audio speed converter 54 receives the digital audio signals from the analog-to-digital (A/D) converter 52 via the first digital switch 53. Alternatively, in situations where m≦1, the control circuit 51 causes the first digital switch 53 to establish the second signal pathway. In this case, a memory device 55 having a storage capacity (S) receives the digital audio signals from the analog-to-digital (A/D) converter 52 via the first digital switch 53. A second digital switch 56 (i.e., switch2) receives outputs from the audio speed converter 54 or the memory device 55 under the control of the control circuit 51. In particular, the second digital switch 56 operates in dependence upon the speed rate (m). A digital-to-analog (D/A) converter 57 receives digital audio signals from the audio speed converter 54 or the memory device 55 via the second digital switch 56, converts the received digital audio signals to an analog format and provides analog audio output signals under the control of the control circuit 51.

In situations where m>1, the control circuit 51 causes the second digital switch 56 to connect the output of the memory device 55 to the input of the digital-to-analog (D/A) converter 57. Alternatively, in situations where m<1, the control circuit 51 causes the second digital switch 56 to connect the output of the audio speed converter 54 to the input of the digital-to-analog (D/A) converter 57. In situations where m=1 (i.e., normal operation), the control circuit 51 causes the second digital switch 56 to connect the output of the memory device 55 to the input of the digital-to-analog (D/A) converter 57, thereby bypassing the audio speed converter 54.

For purposes of example and explanation, assume In FIG. 5 that m=2 which means that the speed of the audio output signals is twice as fast as the speed of the audio input signals. In this case, the digital audio signals output by the analog-to-digital (A/D) converter 52 are input to the audio speed converter 54 via the first digital switch 53. The audio speed converter 54 compresses the input digital audio signals in accordance with the speed rate (m), and transfers compressed digital audio signals to the memory device 55 for storage. At playback, the compressed digital audio signals are read out of the memory device 55 and transferred to the digital-to-analog (D/A) converter 57 via the second digital switch 56 under the control of the control circuit 51. The digital-to-analog (D/A) converter 57 converts the compressed digital audio signals to analog format and provides analog audio output signals under the control of the control circuit 51. In FIG. 5, the dashed lines in the first and second digital switches 53 and 56 and the dashed line between the audio speed converter 54 and the memory device 55 represent a portion of the signal path utilized when m=2.

For purposes of further example and explanation, now assume in FIG. 5 that m=1/2 which means that the speed of the audio output signals is only one half the speed of the audio input signals. In this case, the digital audio signals output by the analog-to-digital (A/D) converter 52 are input to the memory device 55 for storage via the first digital switch 53. At playback, the stored digital audio signals are read out of the memory device 55 and transferred to the audio speed converter 54 for expansion in accordance with the speed rate (m). The expanded digital audio signals are output from the audio speed converter 54 and transferred to the digital-to-analog (D/A) converter 57 via the second digital switch 56 under the control of the control circuit 51. The digital-to-analog (D/A) converter 57 converts the expanded digital audio signals to analog format and provides analog audio output signals under the control of the control circuit 51. In FIG. 5, the solid lines in the first and second digital switches 53 and 56 and the solid line between the audio speed converter 54 and the memory device 55 represent a portion of the signal path utilized when m=1/2.

Regarding the video aspect of the device 50, an analog-to-digital (A/D) converter 62 receives video input signals in analog format and converts the received video input signals to a digital format under the control of the control circuit 51. A third digital switch 63 (i.e., switch3) receives digital video signals from the analog-to-digital (A/D) converter 62 and provides a signal pathway for the received digital video signals in dependence upon a speed rate (m), which may be designated by a user through the user interface 51. In FIG. 5, the third digital switch 63 provides a first signal pathway for the received digital video signals when m>1, and provides a second signal pathway for the received digital video signals when m≦1. The position of the third digital switch 63 is controlled by the control circuit 51.

In situations where m>1, the control circuit 51 causes the third digital switch 63 to establish the first signal pathway. In this case, a video speed converter 64 receives the digital video signals from the analog-to-digital WD) converter 62 via the third digital switch 63. Alternatively, in situations where m≦1, the control circuit 51 causes the third digital switch 63 to establish the second signal pathway. In this case, a memory device 65 having a storage capacity (S) receives the digital video signals from the analog-to-digital (A/D) converter 62 via the third digital switch 63. A fourth digital switch 66 (i.e., switch4) receives outputs from the video speed converter 64 or the memory device 65 under the control of the control circuit 51. In particular, the fourth digital switch 66 operates in dependence upon the speed rate (m). A digital-to-analog (D/A) converter 67 receives digital video signals from the video speed converter 64 or the memory device 65 via the fourth digital switch 66, converts the received digital video signals to an analog format and provides video output signals under the control of the control circuit 51.

In situations where m>1, the control circuit 51 causes the fourth digital switch 66 to connect the output of the memory device 65 to the input of the digital-to-analog (D/A) converter 67. Alternatively, in situations where m<1, the control circuit 51 causes the fourth digital switch 66 to connect the output of the video speed converter 64 to the input of the digital-to-analog (D/A) converter 67. In situations where m=1 (i.e., normal operation), the control circuit 51 causes the fourth digital switch 66 to connect the output of the memory device 65 to the input of the digital-to-analog (D/A) converter 67, thereby bypassing the video speed converter 64.

For purposes of example and explanation, assume in FIG. 5 that m=2 which means that the speed of the video output signals is twice as fast as the speed of the video input signals. In this case, the digital video signals output by the analog-to-digital (A/D) converter 62 are input to the video speed converter 64 via the third digital switch 63. The video speed converter 64 compresses the input digital video signals in accordance with the speed rate (m), and transfers compressed digital video signals to the memory device 65 for storage. At playback, the compressed digital video signals are read out of the memory device 65 and transferred to the digital-to-analog (D/A) converter 67 via the fourth digital switch 66 under the control of the control circuit 51. The digital-to-analog (D/A) converter 67 converts the compressed digital video signals to analog format and provides analog video output signals under the control of the control circuit 51. In FIG. 5, the dashed lines in the third and fourth digital switches 63 and 66 and the dashed line between the video speed converter 64 and the memory device 65 represent a portion of the signal path utilized when m=2.

For purposes of further example and explanation, now assume in FIG. 5 that m=1/2 which means that the speed of the video output signals is only one half the speed of the video input signals. In this case, the digital video signals output by the analog-to-digital (A/D) converter 62 are input to the memory device 65 for storage via the third digital switch 63. At playback, the stored digital video signals are read out of the memory device 65 and transferred to the video speed converter 64 for expansion in accordance with the speed rate (m). The expanded digital video signals are output from the video speed converter 64 and transferred to the digital-to-analog (D/A) converter 67 via the fourth digital switch 66 under the control of the control circuit 51. The digital-to-analog (D/A) converter 67 converts the expanded digital video signals to analog format and provides analog video output signals under the control of the control circuit 51. In FIG. 5, the solid lines in the third and fourth digital switches 63 and 66 and the solid line between the video speed converter 64 and the memory device 65 represent a portion of the signal path utilized when m=1/2.

As described herein, the present invention advantageously conserves memory capacity in systems having a variable speed data reproduction capability. Although the present invention has been described in relation to devices such as a telephone answering machine having audio and/or video capabilities, the invention is also applicable to various other systems, either with or without display devices or speakers, and the phrases "audio device," "video device" or "audio/video device" as used herein are intended to encompass various types of apparatuses and systems including, but not limited to, television sets or monitors that include a display device, and systems or apparatuses such as a telephone answering device, set-top box, video tape recorder (VTR), digital versatile disk (DVD) player, video game box, or personal video recorder (PVR) that may not include display devices and/or speakers.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and which fall within the limits of the appended claims.

The invention claimed is:

1. A system for processing a signal, comprising:
an analog to digital converter receiving said signal; and
a signal reproduction device processing said received signal in dependence upon a mode of operation of said system representing a speed at which said received signal is to be reproduced by said system, wherein said received signal is speed converted and then stored in a memory of said system when said system is in a first mode of operation, and wherein said received signal is stored in said memory of said system without being speed converted when said system is in a second mode of operation;
wherein reproduction of said received signal is enabled in said first mode of operation by reading said received speed converted signal out of said memory, and enabling output of said received speed converted signal, and
wherein reproduction of said received signal is enabled in said second mode of operation by reading said received signal out of said memory, speed converting said received signal, and enabling output of said received speed converted signal, thereby providing a reproduced received signal at a speed less than an input speed corresponding to said received signal.

2. The system of claim 1, wherein said received signal is an audio signal.

3. The system of claim 1, wherein said received signal is a video signal.

4. The system of claim 1, wherein said first mode of operation represents that said received signal will be reproduced by said system at a speed greater than an input speed corresponding to said received signal.

5. The system of claim 1, wherein reproduction of said received signal is enabled by storing said received signal in said memory of said system without being speed converted, reading said received signal out of said memory without being speed converted, and enabling output of said received signal, thereby providing a reproduced received signal at a speed equal to an input speed corresponding to said received signal.

6. The system of claim 1, wherein in said first mode of operation said received signal is speed converted by compressing said received signal in accordance with a designated speed rate.

7. The system of claim 1, wherein in said second mode of operation said received signal is speed converted by expanding said received signal in accordance with a designated speed rate.

8. A system for processing a signal, comprising:
circuitry for receiving said signal; and
circuitry for processing said received signal in dependence upon a mode of operation of said system representing a speed at which said received signal is to be reproduced by said system, wherein said received signal is speed converted and then stored in a memory of said system when said system is in a first mode of operation, and wherein said received signal is stored in said memory of said system without being speed converted when said system is in a second mode of operation;
wherein reproduction of said received signal is enabled in said first mode of operation by reading said received speed converted signal out of said memory, and enabling output of said received speed converted signal, and
wherein reproduction of said received signal is enabled in said second mode of operation by reading said received signal out of said memory, speed converting said received signal, and enabling output of said received speed converted signal, thereby providing a reproduced received signal at a speed less than an input speed corresponding to said received signal.

9. The system of claim 8, wherein said received signal is an audio signal.

10. The system of claim 8, wherein said received signal is a video signal.

11. The system of claim 8, wherein said first mode of operation represents that said received signal will be reproduced by said system at a speed greater than an input speed corresponding to said received signal.

12. The system of claim 8, wherein reproduction of said received signal is enabled by storing said received signal in said memory of said system without being speed converted, reading said received signal out of said memory without being speed converted, and enabling output of said received signal, thereby providing a reproduced received signal at a speed equal to an input speed corresponding to said received signal.

13. The system of claim 8, wherein in said first mode of operation said received signal is speed converted by compressing said received signal in accordance with a designated speed rate.

14. The system of claim 8, wherein in said second mode of operation said received signal is speed converted by expanding said received signal in accordance with a designated speed rate.

15. A method for processing a signal in a signal reproduction device, comprising:
   receiving said signal;
   processing said received signal in dependence upon a mode of operation of said signal reproduction device representing a speed at which said received signal is to be reproduced by said signal reproduction device, wherein said received signal is speed converted and then stored in a memory of said signal reproduction device when said signal reproduction device is in a first mode of operation, and wherein said received signal is stored in said memory of said signal reproduction device without being speed converted when said signal reproduction device is in a second mode of operation;
   enabling reproduction of said received signal in said first mode of operation by reading said received speed converted signal out of said memory, and enabling output of said received speed converted signal, and
   enabling reproduction of said received signal in said second mode of operation by reading said received signal out of said memory, speed converting said received signal, and enabling output of said received speed converted signal, thereby providing a reproduced received signal at a speed less than an input speed corresponding to said received signal.

16. The method of claim 15, wherein said received signal is an audio signal.

17. The method of claim 15, wherein said received signal is a video signal.

18. The method of claim 15, wherein said first mode of operation represents that said received signal will be reproduced by said signal reproduction device at a speed greater than an input speed corresponding to said received signal.

19. The method of claim 15, wherein reproduction of said received signal is enabled by storing said received signal in said memory of said system without being speed converted, reading said received signal out of said memory without being speed converted, and enabling output of said received signal, thereby providing a reproduced received signal at a speed equal to an input speed corresponding to said received signal.

20. The method of claim 15, wherein in said first mode of operation said received signal is speed converted by compressing said received signal in accordance with a designated speed rate.

21. The method of claim 15, wherein in said second mode of operation said received signal is speed converted by expanding said received signal in accordance with a designated speed rate.

22. The system of claim 1, further comprising:
   a control circuit controlling a switching between the modes of operation of said system; and
   wherein in the first mode of operation only the speed converted signal is stored in the memory.

* * * * *